United States Patent [19]

Kawai et al.

[11] 4,332,165
[45] Jun. 1, 1982

[54] GAS FLOW MEASURING DEVICE

[75] Inventors: Hisasi Kawai, Toyohashi; Tsuneyuki Egami, Aichi; Tokio Kohama, Nishio; Hideki Obayashi, Okazaki, all of Japan

[73] Assignee: Nippon Soken, Inc., Nishio, Japan

[21] Appl. No.: 92,024

[22] Filed: Nov. 7, 1979

[30] Foreign Application Priority Data

Nov. 10, 1978 [JP] Japan .................. 53-139142
Nov. 13, 1978 [JP] Japan .................. 53-140186

[51] Int. Cl.$^3$ .............................. G01F 1/68
[52] U.S. Cl. ................................. 73/204
[58] Field of Search ............... 73/116, 204; 323/75 N, 323/75 H, 75 E

[56] References Cited

U.S. PATENT DOCUMENTS

| | | | |
|---|---|---|---|
| 3,648,518 | 3/1972 | Hans | 73/204 |
| 3,800,592 | 4/1974 | Jones, Jr. | 73/204 |
| 3,975,951 | 8/1976 | Kohama | 73/204 |
| 4,016,759 | 4/1977 | Baker | 73/204 |
| 4,080,821 | 3/1978 | Johnston | 73/204 X |

Primary Examiner—Herbert Goldstein
Attorney, Agent, or Firm—Cushman, Darby & Cushman

[57] ABSTRACT

A first temperature dependent resistor and a second temperature dependent resistor are disposed within a single gas passage defined by a branch pipe extending into a conduit for a gas whose flow rate is to be measured. An electric heater is located between these temperature dependent resistors and is heated for the purpose of measurement of the flow rate of the gas. A first reference resistor and a second reference resistor constitute a bridge circuit together with the first and second temperature dependent resistors, and the difference between the potentials at the terminals of the bridge circuit is amplified by a first differential amplifier circuit. The difference between the output voltage of the first differential amplifier circuit and a predetermined reference voltage is then amplified by a second differential amplifier circuit. The output of the second differential amplifier circuit is amplified by a power amplifier, and the output of the power amplifier is used to control the current or voltage supplied to the electric heater.

3 Claims, 10 Drawing Figures

GAS FLOW MEASURING DEVICE

BACKGROUND OF THE INVENTION

This invention relates to a device for measuring the flow rate of a gas. For example, this invention relates to a device for measuring the flow rate of intake air in an internal combustion engine.

There has been proposed a device for measuring the flow rate of intake air in an internal combustion engine which device comprises an electric heater disposed in an air intake pipe of an internal combustion engine, and a pair of temperature dependent resistors located upstream and downstream respectively of the electric heater. In the device, the quantity of heat generated from the electric heater is controlled to maintain a constant temperature difference $\Delta T$ between the temperatures of the two temperature dependent resistors, so that the flow rate of intake air, which is the gas whose flow rate is to be measured, can be measured on the basis of the quantity of electric power supplied to the electric heater.

In such a prior art device, a voltage comparison circuit and an integrating circuit are employed in its measuring circuit so that the temperature difference $\Delta T$ between the temperatures of the temperature dependent resistors can be controlled to be constant. The prior art device having the above construction has however been disadvantageous in that the accuracy of measurement is not so high and the system response is also insufficient due to the presence of a considerable proportion of ripples in the output waveform.

SUMMARY OF THE INVENTION

With a view to obviate the above disadvantage of the prior art device, it is a primary object of the present invention to provide a gas flow rate measuring device of the kind above described which is improved in both the accuracy of measurement and the system response.

DESCRIPTION OF THE PREFERRED EMBODIMENTS

Figure 1:
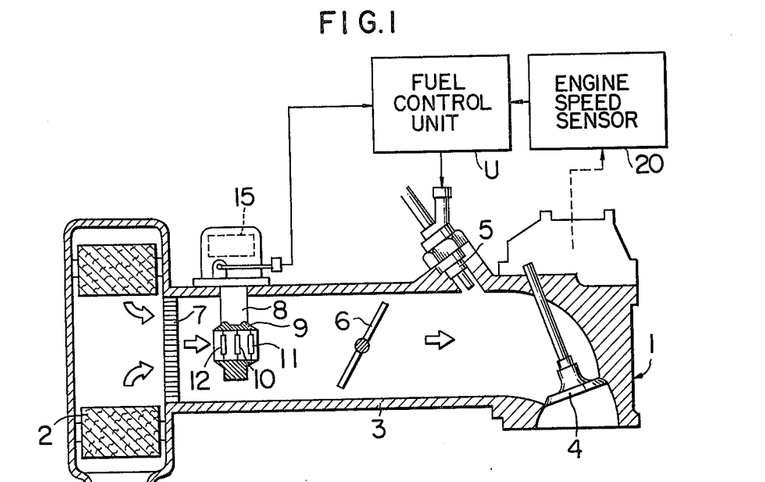
FIG. 1 is a schematic sectional view of part of an internal combustion engine to show the general arrangement of a preferred embodiment of the gas flow rate measuring device according to the present invention.

The present invention will now be described in detail with reference to the drawings. FIG. 1 of the drawings shows the general arrangement of a preferred embodiment of the gas flow rate measuring device according to the present invention. Referring to FIG. 1, part of an internal combustion engine 1 of spark ignition type for driving an automotive vehicle is schematically shown in section, and air for combustion is supplied through an air cleaner 2, an air intake pipe 3 and an intake valve 4. Fuel is injected from an electromagnetic fuel injection valve 5 into the air intake pipe 3.

A throttle valve 6 actuated by the vehicle driver as desired is disposed in the intake pipe 3, and an air rectifier grid 7 for rectifying the stream of intake air is located at the connection between the air cleaner 2 and the intake pipe 3.

Between the air rectifier grid 7 and the throttle valve 6 in the intake pipe 3, there is disposed an air branch pipe or a flow rate measuring pipe 9 of small diameter and short length which is supported by a support 8 to extend in a direction substantially parallel with the axial direction of the intake pipe 3. This flow rate measuring pipe 9 defines a single gas or air passage therein. As schematically shown in FIG. 1, an electric heater 10 is disposed within the single passage defined by the flow rate measuring pipe 9, and a first temperature dependent resistor 11 and a second temperature dependent resistor 12 are disposed downstream and upstream respectively of the electric heater 10 within the single passage defined by the flow rate measuring pipe 9. The first temperature dependent resistor 11 is located at a position relatively close to the electric heater 10, while the second temperature dependent resistor 12 is located at a position relatively spaced apart from the electric heater 10.

Figure 2:
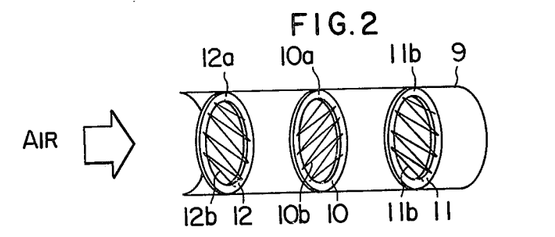
FIGS. 2 and 3 are a perspective view and a front elevational view respectively of the electric heater and the first and second temperature dependent resistors shown in FIG. 1.

As shown in FIG. 2, the electric heater 10 and the first and second temperature dependent resistors 11 and 12 are constructed by mounting resistance wires $10b$, $11b$ and $12b$ of platinum in a lattice-like pattern on associated printed circuit boards $10a$, $11a$ and $12a$ of annular shape respectively. The resistance wires of platinum constituting the first and second temperature dependent resistors 11 and 12 have the same resistance-temperature characteristic. Further, the first temperature dependent resistor 11 is disposed relative to the electric heater 10 in such a relation that the resistance wires of the former cross those of the latter when viewed from the front side or back side, as best shown in FIG. 3, so that the first temperature dependent resistor 11 may not be affected by the slight gradient in the distribution of heat within the single passage defined by the flow rate measuring pipe 9.

All of the electric heater 10 and the first and second temperature dependent resistors 11 and 12 are connected to a measuring circuit 15, and on the basis of the output signals from these elements 10 to 12, the measuring circuit 15 measures the flow rate of intake air and provides an electrical output signal indicative of the measured flow rate.

Figures 3, 4:
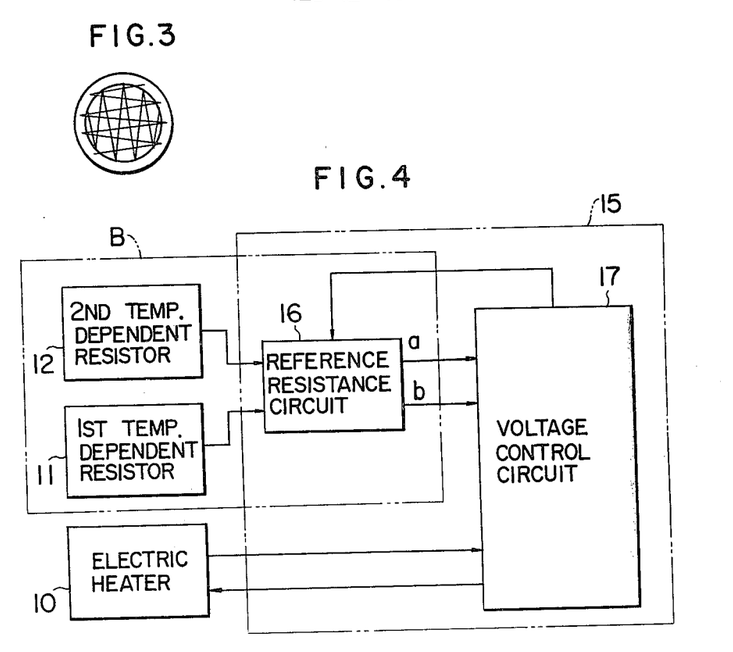
FIG. 4 is a block diagram of a first form of the measuring circuit shown in FIG. 1.

Referring to FIG. 4, this measuring circuit 15 includes a reference resistance circuit 16 and a voltage control circuit 17, and the reference resistance circuit 16 in this measuring circuit 15 constitutes a bridge B together with the first and second temperature dependent resistors 11 and 12. The voltage control circuit 17 controls the voltage applied to the bridge B and to the electric heater 10 depending on the potentials appearing at the diagonal points a and b of the bridge B.

Referring back to FIG. 1, a fuel control unit U controls the open duration of the electromagnetic fuel injection valve 5 in response to the signal applied from the measuring circuit 15. An engine speed sensor 20 sensing the rotational speed of the engine 1 is also connected to the fuel control unit U to apply its output signal indicative of the sensed rotational speed of the engine 1. This engine speed sensor 20 may, for example, be of the type which counts the ignition pulses generated from the ignition circuit. Although the rotational speed of the engine 1 is sensed in the preferred embodiment of the present invention, it is apparent that any one of other engine parameters may be sensed.

Figure 5:
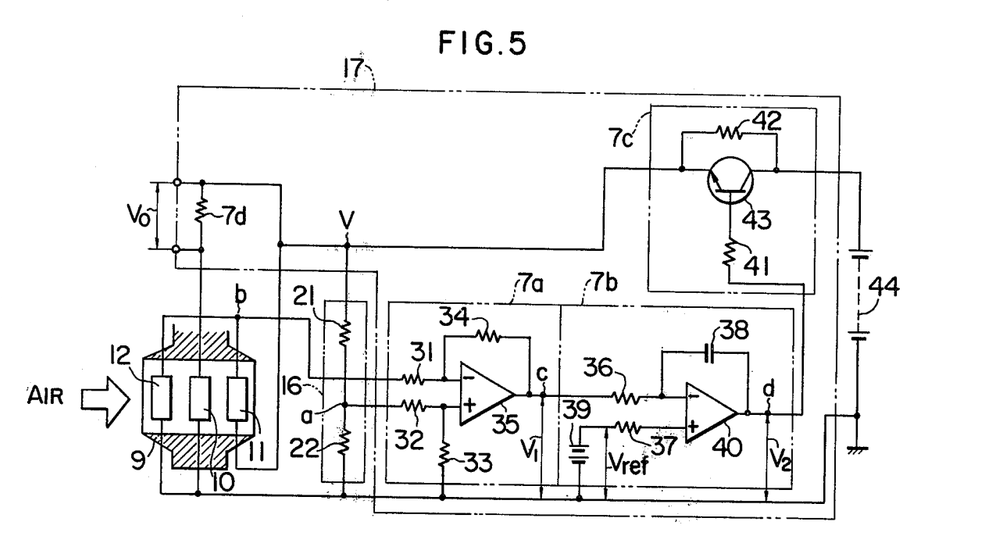
FIG. 5 is an electrical circuit diagram showing in detail the structure of the measuring circuit shown in FIG. 4.

The structure of the circuits 16 and 17 constituting the measuring circuit 15 will be described in detail with reference to FIG. 5. Referring to FIG. 5, the reference resistance circuit 16 is composed of a first reference resistor 21 and a second reference resistor 22 which are connected in series with each other to constitute the bridge B together with the first and second temperature dependent resistors 11 and 12.

The voltage control circuit 17 includes a first differential amplifier circuit 7a, a second differential amplifier circuit 7b, a power amplifier circuit 7c and an output resistor 7d. The first differential amplifier circuit 7a is composed of input resistors 31, 32, a grounding resistor 33, a negative feedback resistor 34 and an operational amplifier 35. This first differential amplifier circuit 7a amplifies the potential difference $\Delta V$ between the potentials appearing at the diagonal points a and b of the bridge B, and the resultant output voltage $V_1$ appears at its output terminal c.

The second differential amplifier circuit 7b is composed of input resistors 36, 37, a capacitor 38, a source 39 of a reference voltage $V_{ref}$ and an operational amplifier 40. This second differential amplifier circuit 7b amplifies the difference between the voltage $V_1$ appearing at the output terminal c of the circuit 7a and the predetermined reference voltage $V_{ref}$ supplied from the reference voltage source 39, and the resultant output voltage $V_2$ appears at its output terminal d. The capacitor 38 is provided for preventing undesirable oscillation of the circuit.

The power amplifier circuit 7c is composed of resistors 41, 42 and a power transistor 43. This power transistor 43 is supplied with a power supply voltage from a battery 44. The power amplifier circuit 7c amplifies the output voltage $V_2$ of the second differential amplifier circuit 7b, and the resultant output voltage V is applied to the bridge B and to the electric heater 10.

The output resistor 7d provides an output voltage $V_0$ related to the flow rate of intake air and is connected in series with the electric heater 10.

The operation of the gas flow rate measuring device having the above construction will now be described. Intake air of an amount determined by the opening of the throttle valve 6 passes through the air cleaner 2 to flow into the intake pipe 3 of the engine 1. A predetermined proportion of the total amount of intake air flows through the single passage defined by the flow rate measuring pipe 9.

The second temperature dependent resistor 12 disposed upstream of the electric heater 10 within the flow rate measuring pipe 9 defining the single passage responds only to the temperature of intake air, while the first temperature dependent resistor 11 disposed downstream of the electric heater 10 within the flow rate measuring pipe 9 defining the single passage responds to both the temperature of intake air and the quantity of heat generated from the electric heater 10, that is, the temperature of air heated by the electric heater 10.

As a result, a temperature difference $\Delta T$ occurs between the temperatures of the first and second temperature dependent resistors 11 and 12 and is a function of the electric power P in watts supplied to the electric heater 10 and the flow rate G of intake air in grams/sec. More precisely, there is the following relation between P, G and $\Delta T$:

$$K_1 \cdot \Delta T = P/G \qquad (1)$$

where $K_1$ is a constant.

Due to the fact that the electrical resistance value of each of the first and second temperature dependent resistors 11 and 12 varies in relation to the temperature of air, there occurs a potential difference $\Delta V$ between the potentials appearing at the points a and b of the bridge B. That is, this potential difference $\Delta V$ is a function of the temperature difference $\Delta T$ and the voltage V applied to the bridge B and is given by the following equation (2):

$$\Delta V = K_2 \cdot \Delta T \cdot V \qquad (2)$$

where $K_2$ is a constant.

Therefore, from the equations (1) and (2), the following equation (3) expressing the relation between $\Delta V$ and V is obtained:

$$K_3 \cdot \Delta V/V = P/G \qquad (3)$$

where $K_3$ is a constant.

Therefore, when the value of $\Delta V$ is maintained to be constant by controlling the power P supplied to the electric heater 10 and the voltage V applied to the bridge B, the flow rate G of intake air is a function of the power P supplied to the electric heater 10 and the voltage V applied to the bridge B and is given by the following equation (4):

$$G = K_4 \cdot P \cdot V \qquad (4)$$

where $K_4$ is a constant.

The resistance value of the output resistor 7d is selected to be small compared with that of the electric heater 10. Thus, the following approximate expressions (5) and (6) hold:

$$P \approx K_5 \cdot I^2 \qquad (5)$$

$$V = K_6 \cdot I \qquad (6)$$

where I is the current flowing through the electric heater 10, and $K_5$ and $K_6$ are constants. Then, the equation (4) is approximately expressed as follows:

$$G \approx K \cdot I^3 \qquad (7)$$

$$\approx K' \cdot V^3 \qquad (8)$$

where K and K' are constants.

It can be therefore seen that the flow rate G of intake air is a function of the third power of the current I or the voltage V. Although the flow rate G of intake air is given by the approximate expression (7) or (8), this approximation will not affect the result of measurement, that is, it can be substantially satisfactorily used in practical measurements without any problem.

The voltage control circuit 17 acts to maintain constant the value of $\Delta V$ by controlling the quantity of heat generated from the electric heater 10. The manner of control will be described in detail. With the increase in the flow rate G of intake air, the rate of temperature rise of air flowing through the single passage and heated by the electric heater 10 is reduced to decrease the temperature difference $\Delta T$ between the temperatures of the first and second temperature dependent resistors 11 and 12, resulting in a corresponding decrease in the potential difference $\Delta V$ between the potentials appearing at the points a and b of the bridge B.

Consequently, the output voltage $V_1$ of the first differential amplifier circuit 7a is lowered, and the output voltage $V_2$ of the second differential amplifier circuit 7b becomes higher since this circuit 7b acts to amplify the voltage difference $(V_{ref}-V_1)$. In response to the appearance of such an increased output voltage $V_2$ from the second differential amplifier circuit 7b, the power amplifier circuit 7c acts to increase the current supplied to the electric heater 10 thereby increasing the quantity of heat generated from the electric heater 10.

Due to the increase in the quantity of heat generated from the electric heater 10, the temperature difference $\Delta T$ between the temperatures of the first and second temperature dependent resistors 11 and 12 increases to increase the potential difference $\Delta V$ between the potentials at the points a and b of the bridge B, until finally the voltage $V_1$ corresponding to the potential difference $\Delta V$ becomes equal to the reference voltage $V_{ref}$. In that state, the entire system is stabilized in its balanced condition, while the bridge B is stabilized in an unbalanced condition.

On the other hand, with the decrease in the flow rate G of intake air, the rate of temperature rise of air heated by the electric heater 10 is increased to increase the temperatue difference $\Delta T$ between the temperatures of the first and second temperature dependent resistors 11 and 12, resulting in a corresponding increase in the potential difference $\Delta V$.

Consequently, the output voltage $V_1$ of the first differential amplifier circuit 7a becomes higher to lower the output voltage $V_2$ of the second differential amplifier circuit 7b, and the current supplied from the power amplifier circuit 7c to the electric heater 10 is decreased to decrease the quantity of heat generated from the electric heater 10.

Due to the decrease in the quantity of heat generated from the electric heater 10, the temperature difference $\Delta T$ decreases to decrease the potential difference $\Delta V$ until finally the voltage $V_1$ corresponding to the potential difference $\Delta V$ becomes equal to the reference voltage $V_{ref}$. In that state, both the entire system and the bridge B are stabilized.

It will thus be understood that the potential difference $\Delta V$ between the potentials appearing at the points a and b of the bridge B is always maintained constant independently of the flow rate G of intake air, and the approximate expression (7) holds in which the flow rate G of intake air is expressed as the function of the third power of the current I supplied to the electric heater 10.

Since this current I flows also through the output resistor 7d, the voltage $V_0$ appearing across the output resistor 7d is proportional to the current I, and the third power of this voltage $V_0$ is proportional to the flow rate G of intake air.

In the present invention, the potential difference $\Delta V$ between the potentials appearing at the points a and b of the bridge B is maintained constant to provide the voltage $V_0$ whose third power is proportional to the flow rate G of intake air. Therefore, the voltage comparison circuit and the integrating circuit required in the prior art device need not be incorporated in the measuring circuit 15, and two differential amplifier circuits as shown in FIG. 5 are only required for this purpose. This voltage $V_0$ is exactly proportional to the flow rate G of intake air so that the accuracy of measurement and the system response can be remarkably improved.

This voltage $V_0$ is applied to the fuel control unit U as a signal indicative of the flow rate G of intake air, and on the basis of this signal and the output signal of the engine speed sensor 20, the fuel control unit U applies a fuel injection pulse signal to the electromagnetic fuel injection valve 5 to open the same. Due to the fact that the valve open timing of the fuel injection valve 5 is controlled by the fuel control unit U in the manner above described, the air-fuel mixture having an accurately controlled air-fuel ratio A/F is supplied to the engine 1 so that the power output, fuel consumption, etc. of the engine 1 can be greatly improved.

Assume that the power supply voltage of the battery 44 varies or increases for some reason while the voltage control circuit 17 is operating stably with the flow rate G of intake air maintained constant. In such an event, the output voltage V of the power amplifier circuit 7c increases although no variation occurs in the output voltage $V_2$ of the second differential amplifier circuit 7b. Consequently, the electric heater 10 generates an increased quantity of heat to increase the resistance value of the first temperature dependent resistor 11, and the potential at the connection point b of the first and second temperature dependent resistors 11 and 12 drops. Consequently, the output voltage $V_1$ of the first differential amplifier circuit 7a increases, and the difference between this voltage $V_1$ and the reference voltage $V_{ref}$ is reduced to decrease the output voltage $V_2$ of the second differential amplifier circuit 7b. Then, the output voltage V of the power amplifier circuit 7c decreases to the stable voltage level existed before the occurrence of the variation in the power supply voltage.

Assume then that the power supply voltage of the battery 44 varies or decreases for some reason. In such an event, the output voltage $V_1$ of the first differential amplifier circuit 7a decreases to increase the output voltage $V_2$ of the second differential amplifier circuit 7b, and the output voltage V of the power amplifier circuit 7c increases until it is also stabilized at the stable voltage level existed before the occurrence of the variation in the power supply voltage.

It will thus be seen that the power amplifier circuit 7c operates as a stabilized power supply circuit supplying a stable output voltage when the flow rate of intake air is maintained constant. Therefore, a constant power supply voltage need not necessarily be supplied to the unregulated power supply input terminal of the voltage control circuit 17, and the voltage control circuit 17 can be directly connected to the power supply terminal of the battery 44.

An analog linearizing circuit may be incorporated in the measuring circuit 15 so as to apply to the fuel control unit U an output signal which is linearly proportional to the flow rate G of intake air.

Figure 6:
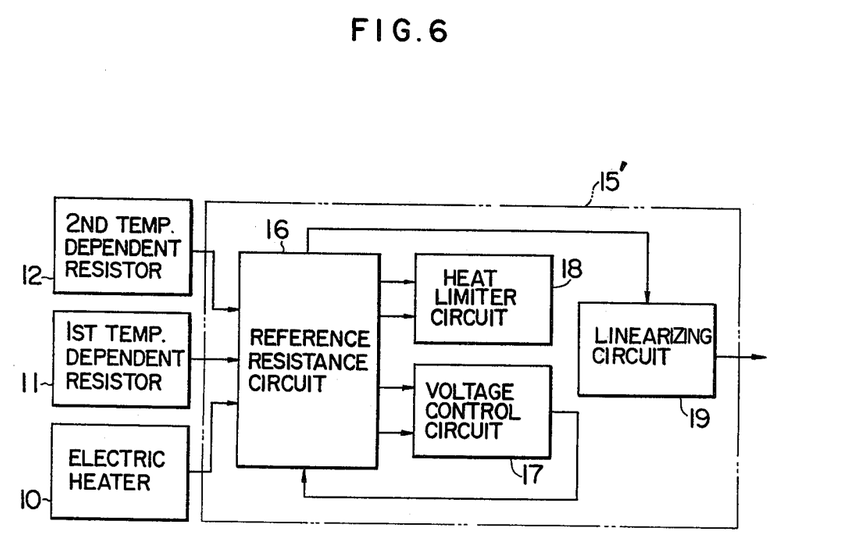
FIG. 6 is a block diagram of a second form of the measuring circuit shown in FIG. 1.

FIG. 6 is a block diagram of a second form of the measuring circuit employed in the present invention. The measuring circuit 15' shown in FIG. 6 includes a reference resistance circuit 16, a voltage control circuit 17, a heat limiter circuit 18 and a linearizing circuit 19. The reference resistance circuit 16 and the voltage control circuit 17 shown in FIG. 6 are the same in construction as those shown in FIG. 4, and therefore, any detailed description of these circuits is unnecessary.

Figure 7:
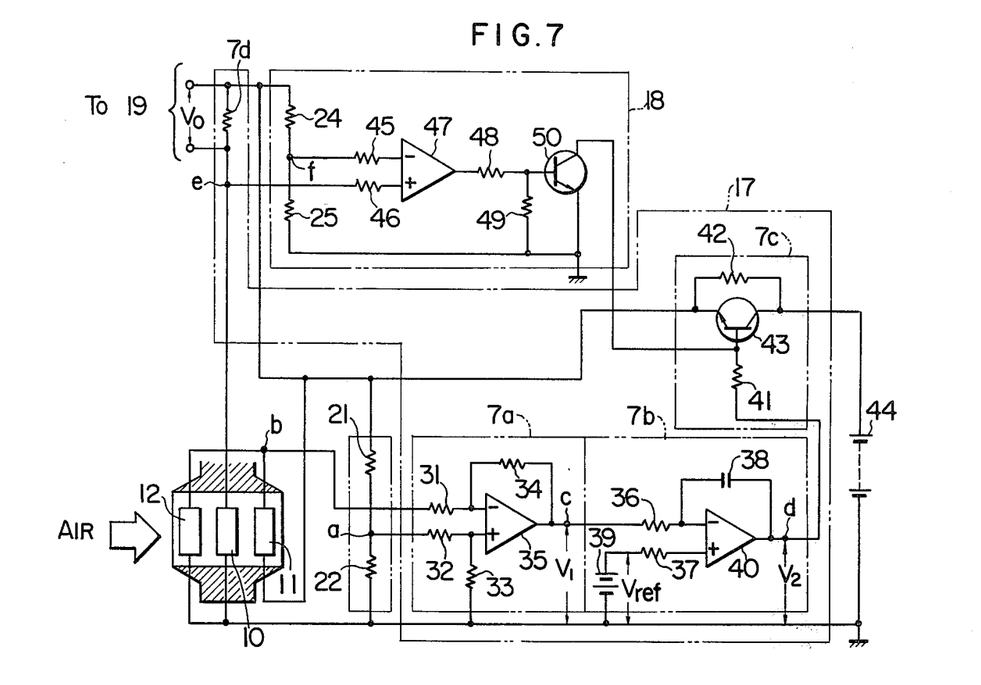
FIG. 7 is an electrical circuit diagram showing in detail the structure of the reference resistance circuit, the voltage control circuit and the heat limiter circuit shown in FIG. 6.

FIG. 7 is an electrical circuit diagram showing in detail the structure of the measuring circuit 15' shown in FIG. 6. Referring to FIG. 7, the heat limiter circuit 18 inclues fourth and fifth reference resistors 24, 25, input resistors 45, 46, a comparator 47, protective resistors 48, 49 and a transistor 50. A third reference resistor 7d in the voltage control circuit 17, a fourth reference resistor 24 and a fifth reference resistor 25 constitute a second bridge together with the electric heater 10, and the potentials appearing at the diagonal points e and f of this second bridge are compared in the comparator 47 so as to control the voltage applied to the base of the power transistor 43 in the power amplifier circuit 7c in the voltage control circuit 17. The third reference resistor 7d in the second bridge acts also as the output resistor across which the voltage $V_0$ related to the flow rate G of intake air appears.

Figure 8:
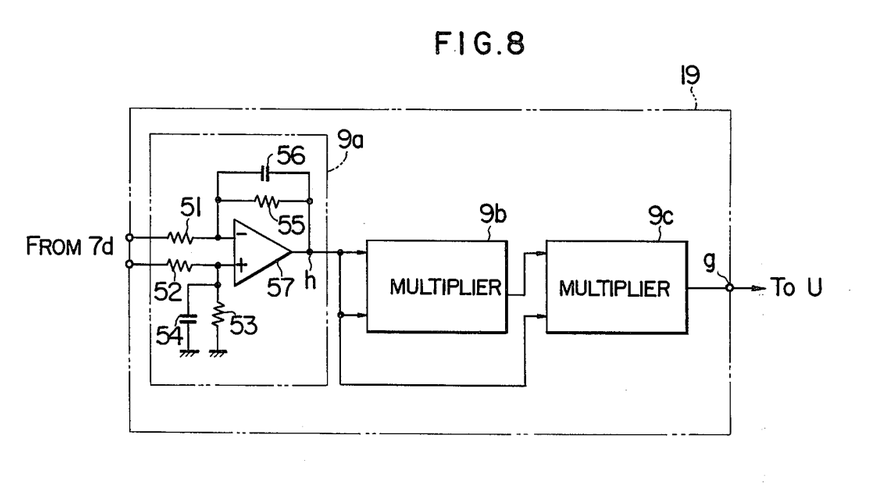
FIG. 8 is an electrical circuit diagram showing in detail the structure of the linearizing circuit shown in FIG. 6.

The structure of the linearizing circuit 19 will be described with reference to FIG. 8. As schematically shown in FIG. 8, this linearizing circuit 19 includes a differential amplifier circuit 9a, a first multiplier 9b and a second multiplier 9c.

The differential amplifier circuit 9a is composed of input resistors 51, 52, a grounding resistor 53, a grounding capacitor 54, a negative feedback resistor 55, another capacitor 56 and an operational amplifier 57, and an output voltage provided by the differential amplification of the output voltage of the reference resistance circuit 16 appears at its output terminal h.

Both the first multiplier 9b and the second multiplier 9c are of the known analog type. Each of these multipliers 9b and 9c multiplies one of two input voltages by the other, and the resultant voltage appears at its output terminal. The output voltage of the second multiplier 9c, hence, the linearizing circuit 19 appears at its output terminal g to be applied to the fuel control unit U.

The structure of the fuel control unit U shown in FIG. 1 will be described with reference to FIG. 9 so that the present invention can more clearly be understood. This fuel control unit U has basically the function of digitally calculating the ratio of the flow rate G of intake air to the rotational speed N of the engine 1 and applying a fuel injection pulse signal corresponding to the calculated ratio G/N to the electromagnetic fuel injection valve 5.

Figure 9:
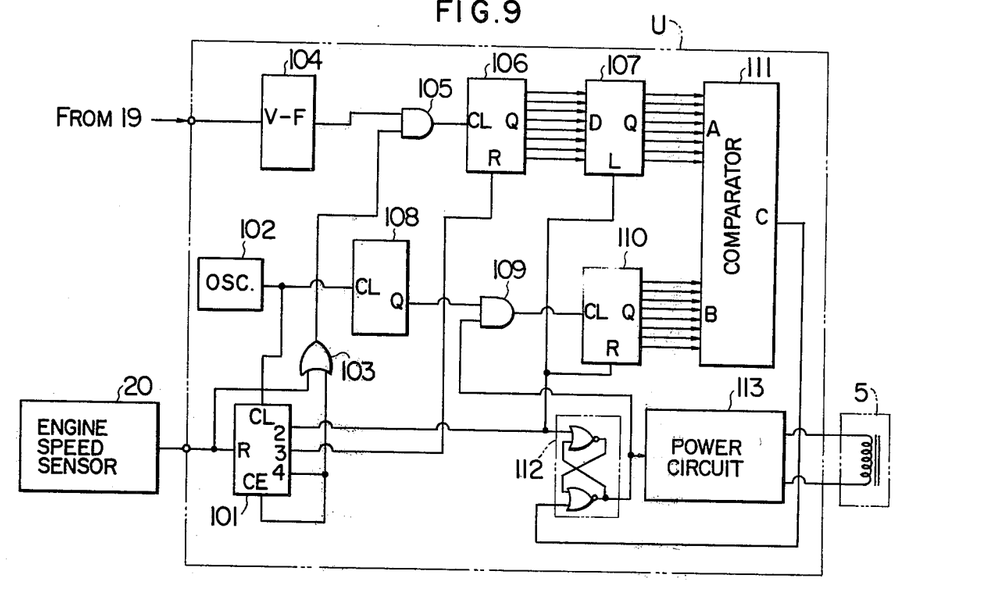
FIG. 9 is an electrical circuit diagram showing in detail the structure of the fuel control unit shown in FIG. 1.

Referring to FIG. 9, a counter with divider 101 is, for example, that of model CD4017 manufactured by the RCA Corporation and has a clock input terminal CL, a reset input terminal R, a clock enable terminal CE, and three output terminals "2", "3" and "4". An oscillator 102 applies its oscillation output signal to the clock input terminal CL of the counter 101, and the engine speed sensor 20 applies its output pulse signal, whose period is inversely proportional to the rotational speed N of the engine 1, to the reset input terminal R of the counter 101. The output signal appearing from the output terminal "4" of the counter 101 is fed back to the clock enable terminal CE of the counter 101.

The oscillator 102 is a known crystal oscillator having a crystal resonator therein to generate a pulse signal which has a constant frequency to provide a clock signal.

A known two-input OR gate 103 makes its OR operation in a usual manner on two input signals applied to its two input terminals respectively. One of the input signals is applied from the engine speed sensor 20, and the other is applied from the output terminal "4" of the counter 101.

A known voltage-frequency (V-F) converter 104 converts the analog output voltage of the linearizing circuit 19 into a pulse signal having a frequency proportional to the sensed flow rate G of intake air.

A known two-input AND gate 105 makes it AND operation in a usual manner on two input signals applied to its two input terminals respectively. One of the input signals is applied from the V-F converter 104, and the other is applied from the OR gate 103.

A known binary counter 106 counts the pulses of the pulse signal applied from the AND gate 105 to its clock input terminal CL and provides a binary-coded digital output signal indicative of the count. Its reset input terminal R is connected to the output terminal "3" of the counter 101.

A known latch circuit 107 stores temporarily the output signal of the binary counter 106 in response to the input signal applied to its latch terminal L from the output terminal "2" of the counter 101.

Another known binary counter 108 counts the pulses of the pulse signal applied to its clock input terminal CL from the oscillator 102. Thus, in this case, this binary counter 108 functions as a frequency divider which divides the frequency of the clock output signal of the oscillator 102.

Another known two-input AND gate 109 makes its AND operation in a usual manner on two input signals applied to its two input terminals respectively. One of the input signals is applied from the binary counter 108, and the other is applied from a flip-flop 112 described later.

Another known binary counter 110 is similar to the aforementioned binary counter 106, and the output signal from the output terminal "2" of the counter 101 is applied to its reset input terminal R. After being reset by the above signal, the binary counter 110 counts the pulses of the output signal of the AND gate 109 applied to its clock input terminal CL and provides a binary-coded digital output signal indicative of the count.

The binary-coded digital output signal from the latch circuit 107 and that from the binary counter 110 are applied to terminal groups A and B respectively of a comparator 111 to be compared with each other. When coincidence is reached between these two input signals each representing a numerical value, a trigger signal appears from the output terminal C of the comparator 111.

A known flip-flop 112 is composed of a pair of two-input NOR gates. The output signal from the output terminal "2" of the counter 101 is applied to one of these two NOR gates to trigger the same, and the output signal from the output terminal C of the comparator 111 is applied to the other NOR gate to trigger the same.

A known power circuit 113 includes a power transistor although not illustrated in FIG. 9. The power circuit 113 controls the energization of the electromagnetic fuel injection valve 5 under control of the input signal applied from the flip-flop 112.

The operation of the fuel control unit U having the above construction will now be described.

As described already, the flow rate G of intake air is a function of the third power of the current I supplied to the electric heater 10. Due to the fact that this current I flows also through the third reference resistor 7d, the voltage $V_0$ across this third reference resistor 7d is proportional to the current I, and the third power of this voltage $V_0$ is proportional to the flow rate G of intake air.

The function of the linearizing circuit 19 is to provide an output voltage which is equal to the third power of the output voltage $V_0$ of the voltage control circuit 17. More precisely, the voltage $V_0$ appearing across the third reference resistor 7d in the voltage control circuit 17 is amplified by the differential amplifier circuit 9a, and an output voltage $A_1 \cdot V_0$ appears at its output terminal h, where $A_1$ is the amplification factor of the differential amplifier circuit 9a. This output voltage $A_1 \cdot V_0$ is applied to the two input terminals of the first multiplier 9b, and an output voltage $A_1^2 \cdot V_0^2$ appears from the first multiplier 9b. The voltage $A_1 \cdot V_0$ and the voltage $A_1^2 \cdot V_0^2$ are applied to the two input terminals respectively of the second multiplier 9c to appear finally as an output voltage $A_1^3 \cdot V_0^3$.

Thus, a voltage $V_g$ proportional to the third power of the voltage $V_0$, that is, proportional to the flow rate G of intake air appears at the output terminal g of the linearizing circuit 19. This voltage $V_g$ is applied to the fuel control unit U as the signal indicative of the sensed flow rate G of intake air. On the basis of this signal and the output signal of the engine speed sensor 20, the fuel control unit U applies the fuel injection pulse signal to the electromagnetic fuel injection valve 5 to open the same.

The operation of the fuel control unit U will be described in further detail with reference to FIG. 10. The counter with divider 101 in the fuel control unit U shown in FIG. 9 is reset by a pulse of the output pulse signal of the engine speed sensor 20 having a waveform as shown in (a) of FIG. 10 and then starts to count pulses of the clock pulse signal applied from the oscillator 102. In synchronous relation with the clock pulse signals immediately after the fall time of the pulse signal shown in (a) of FIG. 10, a pulse signal having a waveform as shown in (b) of FIG. 10 and another pulse signal having a waveform as shown in (c) of FIG. 10 appear from the output terminals "2" and "3" respectively of the counter 101. Further, an output signal having a waveform as shown in (d) of FIG. 10 appears from the output terminal "4" of the counter 101 since the output from this terminal "4" is fed back to the clock enable terminal CE. Therefore, the counter 101 ceases then to count the clock pulse signal until the next reset signal is applied thereto.

Figure 10:
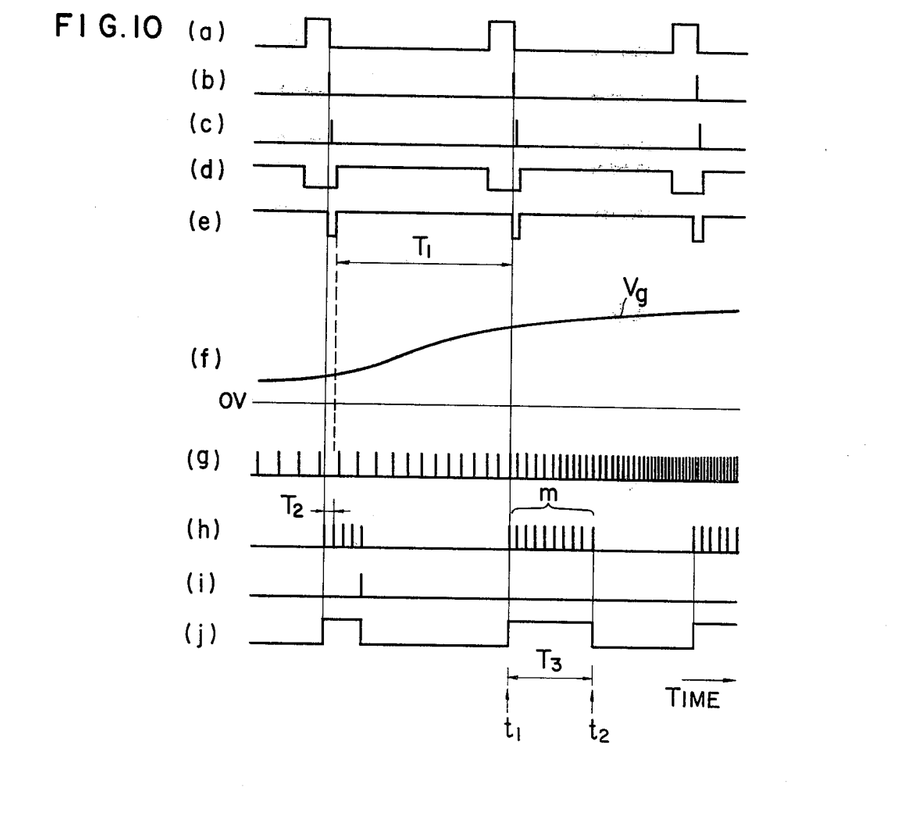
FIG. 10 is a time chart illustrating the operation of the fuel control unit.

Consequently, an output signal having a waveform as shown in (e) of FIG. 10 appears from the OR gate 103. The length of time $T_1$ between the rise time and the fall time of this pulse signal is inversely proportional to the rotational speed N of the engine when the pulse period of the clock output signal of the oscillator 102 is sufficiently shorter than that of the output signal of the engine speed sensor 20 having the waveform shown in (a) of FIG. 10. The output signal from the OR gate 103 is applied to the AND gate 105.

In the meantime, the output voltage $V_g$, which is proportional to the sensed flow rate G of intake air and which has a waveform as shown in (f) of FIG. 10, is applied from the linearizing circuit 19 to the V-F converter 104 to be subjected to the voltage-frequency conversion. Consequently, an output pulse signal having an increasing frequency as shown in (g) of FIG. 10 appears from the V-F converter 104. This pulse signal is applied to the AND gate 105, and the binary counter 106 counts the pulses applied through the AND gate 105 during the period of time $T_1$ shown in (e) of FIG. 10. Thus, the count of this binary counter 106 is proportional to the flow rate G of intake air and inversely proportional to the rotational speed N of the engine. That is, this count corresponds to the ratio G/N. Such a binary-coded digital output signal of the binary counter 106 is stored temporarily in the latch circuit 107 in synchronism with the application of the signal, shown in (b) of FIG. 10, to its latch terminal.

In the meantime, the binary counter 108 divides the frequency of the clock pulse signal applied from the oscillator 102 to provide an output pulse signal having a suitable frequency, and such a pulse signal is applied to the AND gate 109. This AND gate 109 is opened at time $t_1$ at which the flip-flop 112 is set by the trigger signal applied from the output terminal "2" of the counter 101 and having the waveform shown in (b) of FIG. 10. The binary counter 110 is reset at this time $t_1$ by the signal shown in (b) of FIG. 10 and then starts to count the pulses shown in (h) of FIG. 10, which pulses are applied through the AND gate 109.

The binary-coded digital output signal from the latch circuit 107 has already been applied to the comparator 110 at this time $t_1$. The count of the binary counter 110 increases until time $t_2$ at which it coincides with the numerical value supplied already from the latch circuit 107 to the comparator 111. At this time $t_2$, the coincidence signal shown in (i) of FIG. 10 appears from the comparator 111 to reset the flip-flop 112. Consequently, the fuel injection pulse signal having a waveform as shown in (j) of FIG. 10 appears from the flip-flop 112 to be applied to the power circuit 113.

As soon as the flip-flop 112 is reset at time $t_2$, the AND gate 109 is closed, and the binary counter 110 ceases its counting operation. Suppose that the number of pulses having been counted by the binary counter 110 up to that time $t_2$ is m, and the period of the pulse signal shown in (h) of FIG. 10 is $T_2$. Then, the duration $T_3$ of the corresponding pulse in the output signal from the flip-flop 112 is given by the following equation:

$$T_3 = m \times T_2$$

This means that the value open duration $T_3$ corresponds to the ratio G/N between the flow rate G of intake air and the rotational speed N of the engine. In other words, this duration $T_3$ is proportional to the flow rate G of intake air per revolution of the engine.

The fuel injection pulse signal shown in (j) of FIG. 10 is subjected to power amplification in the power circuit 113 and is then applied to the electromagnetic fuel injection valve 5. Therefore, the quantity of fuel injected from the fuel injection valve 5 and the flow rate G of intake air mixed with the fuel have a 1:1 correspondence, so that the air-fuel ratio can be accurately controlled to improve the exhaust gas purification performance, power output, fuel consumption, etc. of the engine 1.

In FIG. 7, the potential difference ΔV between the potentials at the points a and b of the first bridge will be kept in its low value when the flow rate G of intake air continues to be substantially null over a relatively long period of time. That is, although the voltage applied from the voltage control circuit 17 to the first and second bridges increases due to the low potential difference, ΔV, any appreciable variation does not occur in this potential difference ΔV due to the fact that the heat generated from the electric heater 10 is not substantially transmitted to the first temperature dependent resistor 11 located downstream of the heater 10.

Consequently, the surface temperature of the electric heater 10 continues to rise due to the increased heat generated from the heater 10. The resistance value of the electric heater 10 itself increases to raise the potential at the connection point e of the reference resistor 7d and the electric heater 10 in the second bridge. When the potential at this point e exceeds the predetermined potential at the connection point f of the reference resistors 24 and 25, an output signal of "1" level appears from the comparator 47 to turn on the transistor 50 thereby turning off the power transistor 43. Consequently, the current flows through the resistor 42 only. Since the resistance value of this resistor 42 is suitably selected, the voltage applied from the voltage control circuit 17 to the second bridge is lowered to decrease the heat generated from the electric heater 10, that is, the resistance value of the electric heater 10 itself decreases.

Due to the decrease in the resistance value of the electric heater 10, the potential at the terminal e of the second bridge drops until finally it becomes lower than that at the terminal f of the second bridge. Consequently, the output signal of the comparator 47 turns into its "0" level from the previous "1" level to turn off the transistor 50, and the power transistor 43 is turned on so that the voltage control circuit 17 starts its control operation again. Thereafter, the electric heater 10 starts to generate heat again, and when the potential at the terminal e of the second bridge exceeds that at the terminal f with the increase in the resistance value of the electric heater 10 itself due to the increased heat generated from the heater 10, the transistors 50 and 43 are turned on and off respectively to repeat the operation above described. Thus, when no stream of air is present within the flow rate measuring pipe 9, the heat limiter circuit 18 acts to limit the surface temperature of the electric heater 10 to a value lower than the setting determined by the reference resistors 7d and 24, so as to prevent generation of an unusually large quantity of heat from the electric heater 10.

The aforementioned embodiments have been described with reference to the application of the present invention to an engine of the fuel injection type. It will be apparent, however, that the present invention is also equally effectively applicable to an engine of the carburetor type in which the flow rate of intake air is measured to control the rate of exhaust gas recirculation, the ignition timing advance, etc. It will be apparent further that the present invention finds also applications to gas flow rate measurements in the field of industrial instrumentation, in addition to its application to the engines.

Further, in lieu of the analog linearizing circuit 19 employed in the measuring circuit 15' shown in FIG. 6, a digital signal processing unit including a read-only memory (ROM) may be used. This analog linearizing circuit 19 may be unnecessary when a linear output is not required.

What is claimed is:

1. A gas flow measuring device comprising:

a flow rate measuring pipe disposed within a conduit for a gas whose flow rate is to be measured, said flow rate measuring pipe defining a single gas passage extending in the axial direction of said conduit;

a first temperature dependent resistor, and electric heater and a second temperature dependent resistor disposed within the single gas passage defined by said flow rate measuring pipe and along the flow of the gas within said single gas passage, said electric heater being located between said first and second temperature dependent resistors; and a measuring circuit connected to said first and second temperature dependent resistors and to said electric heater to generate an output voltage indicative of the flow rate of the gas depending on the resistance values of said first and second temperature dependent resistors;

said measuring circuit including a first reference resistor and a second reference resistor constituting a bridge circuit together with said first and second temperature dependent resistors; a first differential amplifier circuit connected to said bridge circuit for the amplification of the potential difference between the potentials at the diagonal points of said bridge circuit; a second differential amplifier circuit connected to said first differential amplifier circuit for the amplification of the difference between the amplified output voltage of said first differential amplifier circuit and a predetermined reference voltage; a power amplifier connected to said second differential amplifier circuit for the power amplification of the amplified output voltage of said second differential amplifier circuit; an output resistor connected to said power amplifier and to said electric heater to provide thereacross said output voltage the third power of which is proportional to the flow rate of the gas subjected to the flow rate measurement; and a heat circuit connected to said electric heater, to said output resistor and to said power amplifier to disable said power amplifier depending on the resistance value of said electric heater.

2. A gas flow measuring device according to claim 1, further comprising a linearizing circuit connected to said output resistor to provide an output voltage proportional to the third power of the voltage appearing across said output resistor.

3. A gas flow measuring device according to claim 1, wherein said heat limiter circuit includes:

a third reference resistor and a fourth reference resistor constituting a second bridge circuit together with said output resistor and said electric heater;

a comparator connected to said second bridge circuit to compare the potentials at the diagonal points of said second bridge circuit; and switching means connected to said comparator and to said power emplifier to disable said power amplifier depending on the output of said comparator.

* * * * *